(12) United States Patent
Choi et al.

(10) Patent No.: US 9,007,924 B2
(45) Date of Patent: Apr. 14, 2015

(54) BALANCING LOAD DISTRIBUTIONS OF LOOPBACK PORTS

(71) Applicant: Hewlett-Packard Development Company, L.P., Houston, TX (US)

(72) Inventors: Byung Kyu Choi, Roseville, CA (US); Mark W. Fidler, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 13/753,064

(22) Filed: Jan. 29, 2013

(65) Prior Publication Data

US 2014/0211623 A1    Jul. 31, 2014

(51) Int. Cl.
| | | |
|---|---|---|
| G01R 31/08 | (2006.01) | |
| G06F 11/00 | (2006.01) | |
| G08C 15/00 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 12/803 | (2013.01) | |

(52) U.S. Cl.
CPC .................................. *H04L 47/125* (2013.01)

(58) Field of Classification Search
USPC ............... 370/230.1, 232–234, 238, 249, 404
See application file for complete search history.

(56) References Cited

U.S. PATENT DOCUMENTS

| | | | |
|---|---|---|---|
| 6,473,424 B1 | 10/2002 | DeJager et al. | |
| 6,574,667 B1* | 6/2003 | Blumenau et al. | 709/229 |
| 7,835,358 B2 | 11/2010 | Gallatin et al. | |
| 7,990,873 B2 | 8/2011 | Brolin | |
| 8,493,867 B1* | 7/2013 | Cheriton | 370/236 |
| 2003/0179707 A1* | 9/2003 | Bare | 370/235 |
| 2004/0024906 A1* | 2/2004 | Valdevit et al. | 709/241 |
| 2009/0116402 A1* | 5/2009 | Yamasaki | 370/253 |
| 2010/0082787 A1* | 4/2010 | Kommula et al. | 709/223 |
| 2010/0157840 A1* | 6/2010 | Sen et al. | 370/253 |
| 2010/0195494 A1* | 8/2010 | Sun et al. | 370/230 |
| 2010/0303084 A1* | 12/2010 | Keeley et al. | 370/401 |
| 2011/0283013 A1 | 11/2011 | Grosser et al. | |
| 2012/0207175 A1* | 8/2012 | Raman et al. | 370/412 |
| 2012/0307636 A1* | 12/2012 | Song et al. | 370/235 |
| 2014/0211623 A1* | 7/2014 | Choi et al. | 370/235 |

OTHER PUBLICATIONS

"FM3000 Policy Engine Embedded High-bandwidth Packet Processing," White Paper, WP PolicyEng, Jun. 26, 2008, <http://www.fulcrummicro.com/documents/applications/FM3000_Policy_En.
Clapp, R., Getting the Most Out of Your SonicWall—Network Monitoring Through SNMP (pare 2 of 2)—Finding Your STG Settings, May 15, 2011. <http://www.interworks.com/blogs/.

* cited by examiner

*Primary Examiner* — Benjamin H Elliot, IV
(74) *Attorney, Agent, or Firm* — VanCott, Bagley, Cornwell (57) ABSTRACT

Balancing load distributions of loopback ports includes determining that a load distribution among loopback ports of a switch is unbalanced, determining whether the load distribution is balanceable, and balancing the load distribution.

20 Claims, 5 Drawing Sheets

BALANCING LOAD DISTRIBUTIONS OF LOOPBACK PORTS

BACKGROUND

A switch generally forwards an incoming packet from an input port to another port, such as an output port. For Layer 2 packets, the source and destination medium access control (MAC) addresses are used to determine to which of the output port to forward the packet. Likewise, for Layer 3 packets, the destination internet protocol (IP) address is used to determine to which output port to send the packet.

Tunneling is a technique to deliver a packet from a first point to a second point which may only be possible using the additional tunnel headers or in a more secure protocol provided by the tunneling protocol. Tunneling generally involves encapsulating a complete packet by giving the packet a tunnel packet header that appears before the payload header of the packet. The point where the tunnel header is added is called the tunnel entry point, the tunnel entry point will be identified by the source address of the tunnel header. The destination address of the tunnel header points to the device that is the termination point of the tunnel, which is called the tunnel exit point, where the embedded packet exits the tunnel. The switch which is the tunnel exit point receives the tunneled packet and will, de-capsulate the packet by removing the tunnel header. After decapsulation the payload header of the formerly encapsulated packet is read to determine the forwarding decision of the packet. To give more flexibility for forwarding decisions at the tunnel exit point, a two pass system may be incorporated, where the first pass deals with the tunnel header and the second pass will make forwarding decisions based on the payload packet information. To perform the second pass of forwarding decisions, an efficient way to use existing forwarding hardware is to recirculate the packet from the outbound side back to the inbound side of the switch. This recirculation can be accomplished by using ports that can be called loopback ports. Recirculation can benefit the processing of tunneled packets and potentially other packets that may require a multi-pass forwarding path.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

From the switch's underlying hardware system's perspective, the packet is processed once if the packet is received at the input port and sent directly to an output port. However, for encapsulated packets arriving at the tunnel exit point, the packet is actually processed twice. The first processing occurs when the encapsulated packet header is read at the input port, and the second processing occurs when the regular packet header is read.

One way to process the packet twice is to use a loopback port. In response to determining that a packet is encapsulated, the switch sends the packet to an internal loopback port where the payload packet header is read. The tunnel header is discarded, and the packet is treated by the loopback port as if it were a regular incoming packet.

Due to network policies or packet classification needs, some packets can just be processed by specific loopback ports. Such loopback port service policies may include criteria that is considered when sending a packet to a loopback port or a group of loopback ports. Such criteria can include the quality of service, the input port from which the tunnel packet was received, the tunnel protocol, other criteria, or combinations thereof. Other policies can also restrict to which loopback ports the packets are forwarded. Such policies may cause some of the loopback ports to bear a disproportionate amount of the load. As a loopback port is overworked, packets and/or bytes are dropped resulting in undesirable outcomes. An unbalanced load distribution increases the probability that some packets and/or bytes will be dropped, and thus, an unbalanced load distribution is undesirable.

The principles describe herein include a method for load balancing loopback ports. Such a method includes determining that a load distribution of loopback ports of a switch is unbalanced, determining whether the load distribution is balanceable, and balancing the load distribution.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
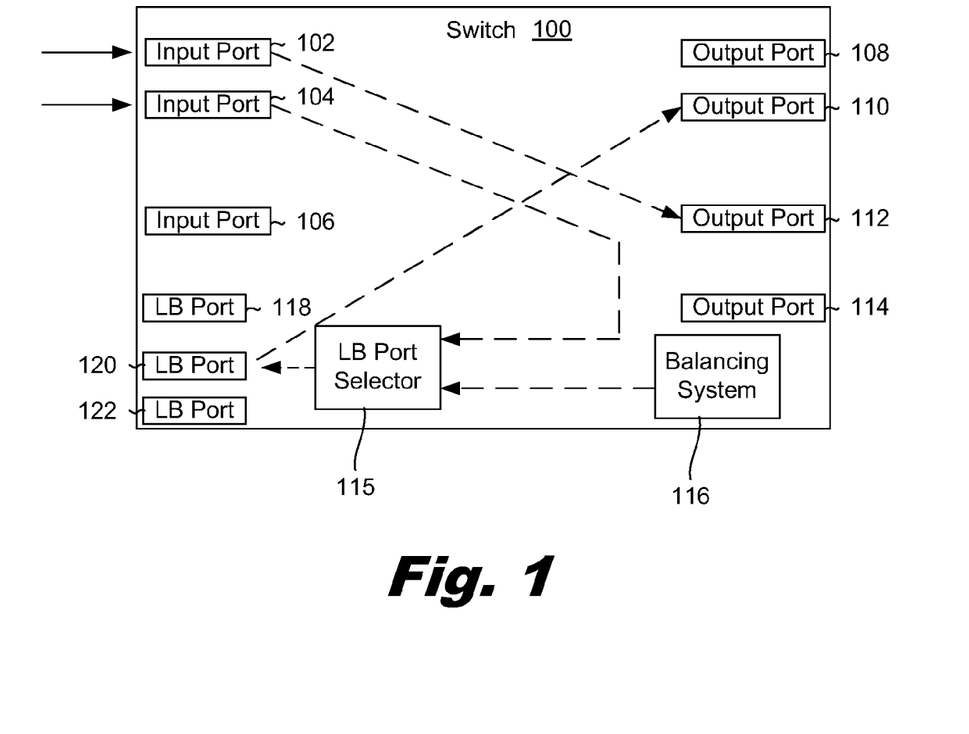
FIG. 1 is a diagram of an example of a switch according to the principles described herein.

FIG. 1 is a diagram of an example of a switch (100) according to the principles described herein. In this example, the switch (100) includes multiple input ports (102, 104, 106) and multiple output ports (108, 110, 112, 114). The packets are received at one of the input ports (102, 104, 106) of the switch (100). For those packets that do not have encapsulated packets contained therein, the packet is processed once. The packet header is read, and the packet is sent to one of the output ports (108, 110, 112, 114).

For those packets received at a switch that is at the end of the tunnel that contain an encapsulated packet, the packets are still received at one of the input ports (102, 104, 106). In response to being received, the tunnel packet header is read, and the switch (100) begins processing the packet. However, in response to discovering an encapsulated packet, the switch (100) disregards the tunnel packet header and sends the packet to a loopback port selector (115) within the switch (100). The loopback port selector (115) determines to which of multiple loopback ports (118, 120, 122) to send the packet. A balancing system (116) is in communication with the loopback port selector (115) and determines whether the workload across the loopback ports (118, 120, 122) is evenly distributed. The balancing system (116) continuously monitors the loopback ports (118, 120, 122) to determine whether they are balanced.

The balancing system (116) may use a function that considers at least one factor to determine whether the load distribution is balanced. The function may result in a unified metric that allows the balancing system (116) to easily identify when the load distribution is unbalanced. The function and the unified metric are described in more detail below.

In the event that the balancing system (116) determines that the loopback ports (118, 120, 122) are balanced, the loopback port selector (115) sends the packet to an appropriate loopback port (118, 120, 122). The loopback port selector (115) may be restricted to which loopback ports it can send any particular packet due to loopback port service policies. For example, such a policy may indicate that a packet can just go to loopback ports that belong to the same group as the input port that originally received the packet. However, any appropriate loopback port service policy may be used in accordance with the principles described herein.

One type of loopback port service policy can be implemented when the switch is in communication with virtual local area networks (VLAN). Such VLAN policies cause different groups of ports to be assigned to different VLANs. Thus, every port in a group assigned to a VLAN is a member of the VLAN. The loopback port is not an exception because the loopback port has to present the packet to the switch as if the packet were an original packet directly received from an input port. Thus, each loopback port (118, 120, 122) is allowed to serve some VLAN packets, but not other VLAN packets.

Due to the policies that restrict to which loopback ports (118, 120, 122) the packets are forwarded, the load distribution has a higher probability that it will become unbalanced, which can result in dropping packets. In some examples, the balancing system (116) determines whether the load distribution is balanced in response to the loopback port selector (115) receiving a packet. In other examples, the balancing system (116) continuously monitors the load distribution to determine whether the load distribution is balanced.

The balancing system (116) may determine that the load distribution is balanced by determining how many packets are dropped by a loopback port. If just specific loopback ports are dropping packets and/or bytes while the other loopback ports are not, the balancing system (116) may conclude that the loopback ports are unbalanced. In situations where at least most or nearly none of the loopback ports (118, 120, 122) are dropping packets and/or bytes, the balancing system (116) may determine that the load is balanced. In other examples, the loopback port selector (115) records to which of the loopback ports (118, 120, 122) it sends the packets. In such an example, the balancing system (116) consults its historical records of the loopback port selector (115) to determine whether the load is substantially evenly distributed across the loopback ports (118, 120, 122). While this example has been described with reference to specific mechanisms for determining that the load distribution is unbalanced, any appropriate mechanism may be used in accordance with the principles described herein. For example, the equations described below may be used in accordance with the principles described herein to determine whether the load distribution is unbalanced.

In response to determining that that the loopback ports (118, 120, 122) are unbalanced, the balancing system (116) determines whether the load distribution is capable of being balanced. If not, no further action is taken by the balancing system (116). On the other hand, if the balancing system (116) determines that the load distribution can be balanced and that such a process is justifiable, the balancing system (116) proceeds to balance the load distribution.

To balance the load distribution, the balancing system (116) takes periodic measurements according to a sampling rate to measure the parameters of the packets' traffic. If the sample rate is too long, the load balancing will not be as effective due to slow responsiveness. On the other hand, if the sampling rate is too frequent, excessive processing, too frequent load balancing, and other inefficiencies will result. Thus, the balancing system (116) determines the appropriate length of the sampling rate as part of the balancing process. More detail about determining the sampling rate length is included later.

The balancing system (116) also determines whether the load distribution is balanced between groups of loopback ports (118, 120, 122). For example, if several groups of loopback ports exist, where each of the groups is assigned to a specific loopback port service group, the balancing system (116) determines whether the load is distributed across each of the groups. Likewise, the balancing system (116) also determines whether the load distribution is balanced within each of the individual groups across the members of the group.

The following expressions may be used to determine the different stages of the balancing process. As mentioned above, a unified metric can be used to determine whether the load distribution is unbalanced. In some examples, the unified metric is an overload index ($O_{index}$) that is calculated to determine if a single loopback port is overloaded. The $O_{index}$ can be expressed as:

$$O_{index} \leftarrow (R_{drop})/(B_{port}),$$

where $B_{port}$ represents the bandwidth of a member loopback port of group "g," and $R_{drop}$ represents the drop rate. The "$\leftarrow$" symbol represents that the variables on the left side of the expression are being filled with the values from the right side of the expression. The $R_{drop}$ is expressed as:

$$D_{byte}/(S_{byte}+D_{byte}),$$

where $D_{byte}$ represents the number of bytes dropped due to the packet buffer overflowing at the loopback port during the last sampling period and $S_{byte}$ represents the number of bytes served during the last sampling period.

To determine whether the load distribution can be balanced among different groups, the following process may be followed. Measurements from two groups, g and h, are collected during a sampling period i. If the $O_{index}$ for group g ($O^i_g$) is less than the $O_{index}$ for group h ($O^i_h$), then:

$$O^i_g \leftarrow (R^i_g)/(B_g - B_{port}),$$

where $R^i_g$ represents group g's drop rate during period i, $B_g$ represents the aggregate port bandwidth of group g, and $B_{port}$ represents the bandwidth of a member loopback port of group "g," and $$O^i_h \leftarrow (R^i_h)/(B_h + B_{port}),$$

where $R^i_h$ represents group h's drop rate during period i, $B_h$ represents the aggregate port bandwidth of group h, and $B_{port}$ represents the bandwidth of a member loopback port of group "g".

On the other hand, if $O^i_g$ is greater than $O^i_h$, then:

$$O^i_g \leftarrow (R^i_g)/(B_g + B_{port}),$$

where $R^i_g$ represents group g's drop rate during period i, $B_g$ represents the aggregate port bandwidth of group g, and $B_{port}$ represents the bandwidth of a member loopback port of group "h;" and $$O^i_h \leftarrow (R^i_h)/(B_h - B_{port}),$$

where $R^i_h$ represents group h's drop rate during period i, $B_h$ represents the aggregate port bandwidth of group h, and $B_{port}$ represents the bandwidth of a member loopback port of group "h".

The expressions above are used to determine whether the load distribution between different groups can be balanced. If the conditions of the above expressions are met, then the load distribution between these groups is already balanced. On the other hand, if these conditions of the above expressions are not met, then the load distribution is unbalanced. To balance the load distribution between the groups, bandwidth is appropriately reallocated between the groups. If after reallocating the bandwidth, the conditions of the above expressions are met then the load distribution between the groups is balanced, and no further balancing is done. On the other hand, if the conditions remain unmet, then the bandwidth reallocation is repeated until the conditions are met.

To determine whether the load distribution can be balanced within a single group, the following process may be followed. $O^i_l$ represents the overload index of the loopback port l for the sampling period i, and $O^i_m$ overload index of the loopback port m for the sampling period i. If $O^i_l$ is greater than $O^i_m$, then:

$$O^i_l \leftarrow (R^i_l + R^i_T)/B_l$$

where $R^i_l$ represents the drop rate of port l for the sampling period i, $R^i_T$ represents
the portion of the drop rate caused by the traffic flow ($T_{flow}$) of either port m if ($O^i_l < O^i_m$) or port l if ($O^i_l > O^i_m$), for the sampling period i, and $B_l$ represents the bandwidth of the port l; and $$O^i_m \leftarrow (R^i_m - R^i_T)/B_m$$

where $R^i_m$ represents the drop rate of port m for the sampling period i and $B_m$ represents the bandwidth of the port m.

On the other hand, if $O^i_l$ is greater than $O^i_m$, then:

$$O^i_l \leftarrow (R^i_l - R^i_T)/B_l$$

where $R^i_l$ represents the drop rate of port l for the sampling period i, $R^i_T$ represents
the portion of the drop rate caused by $T_{flow}$ of either port m if ($O^i_l < O^i_m$) or port l if ($O^i_l > O^i_m$), for the sampling period i, and $B_l$ represents the bandwidth of the port l; and $$O^i_m \leftarrow (R^i_m - R^i_T)/B_m$$

where $R^i_m$ represents the drop rate of port l for the sampling period i and $B_m$ represents the bandwidth of the port m.

The expressions above are used to determine whether the load distribution within a single group can be balanced. When the conditions of the expressions are met, then the load distribution within the group is already balanced. On the other hand, if the conditions of the above expressions are not met, then the load distribution is unbalanced. To balance the load distribution within the groups, bandwidth is appropriately reallocated between ports. If after reallocating the bandwidth, the conditions of the above expression are met, then the load distribution with the group is balanced, and no further balancing is done. On the other hand, if the conditions are not met, then the bandwidth reallocation is repeated until the conditions are met.

Figure 2:
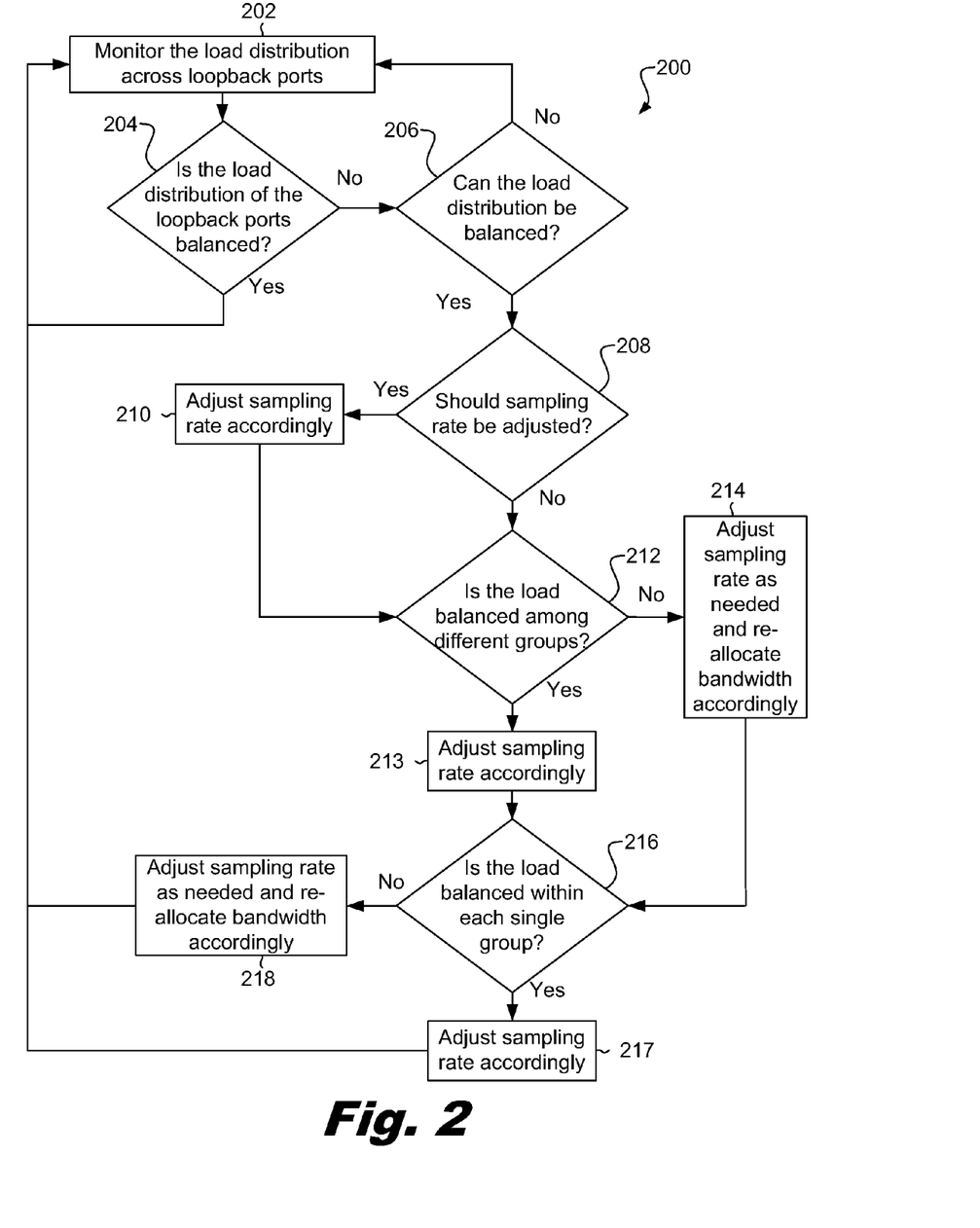
FIG. 2 is a diagram of an example of flowchart of a process for load balancing loopback ports according to the principles described herein.

FIG. 2 is a diagram of an example of flowchart (200) of a process for load balancing loopback ports according to the principles described herein. In this example, the process includes monitoring (202) the load distribution across the loopback ports and determining (204) whether the load distribution of the loopback ports is balanced. If the load distribution is balanced, the process includes continuing to monitor (202) the load distribution. If the load distribution is not balanced, the process determines (206) whether the load distribution is capable of being balanced. If the load distribution cannot be balanced, the process continues to monitor (202) the load distribution.

If the load distribution is capable of being balanced, the process includes determining (208) whether the sampling rate should be adjusted. If so, the process includes adjusting (210) the sampling rate as appropriate. The process also includes determining (212) whether the load is balanced across different groups of loopback ports. If the load distribution is not balanced across the different groups, the process includes adjusting (214) the sampling rate as needed and reallocating bandwidth to balance the load distribution. If the load distribution is balanced across the different groups, the sampling rate is still adjusted (213). Further, the process includes determining (216) whether the load distribution is balanced between ports within the individual groups. If not, the process includes adjusting (218) the sampling rate as needed and reallocating the bandwidth between the ports of the group accordingly. If the load distribution is balanced between ports within the individual groups, the sampling rate is still adjusted (217).

Figure 3:
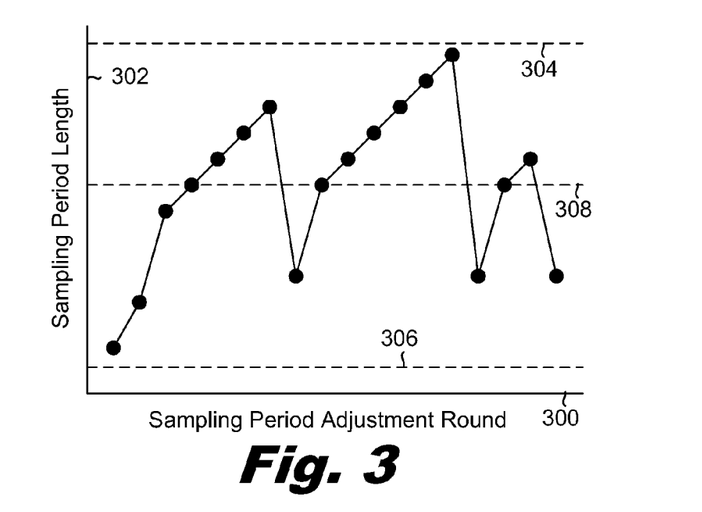
FIG. 3 is a chart of an example of determining a sampling rate according to the principles described herein.

FIG. 3 is a chart of an example of determining a sampling rate according to the principles described herein. In this example, the x-axis (300) schematically represents a sampling period adjustment round, and the y-axis (302) schematically represents a sampling period length. A maximum sampling period length is schematically represented with line (304), and a minimum sampling period length is schematically represented with line (306). The minimum and maximum sampling period lengths may be inputted into the balancing system by a network administrator familiar with the network's details. In other examples, the minimum and maximum sampling period lengths are calculated based on at least one factor controlled by a sampling rate policy.

Based on the minimum and maximum sampling period lengths, a sampling rate adjustment threshold is determined, which is schematically represented with line (308). In some examples, the network administrator also provides this value for the sampling rate adjustment threshold. In other examples, the sampling rate adjustment threshold is calculated based on at least one factor controlled by a sampling rate policy.

During the first sampling rate adjustment round, the sampling rate is set to a short time period near the minimum sampling period. If no bytes and/or packets are dropped during the first sampling period adjustment round, the sampling rate length of the second sampling rate length is doubled from its value during the first round. If the second sampling rate period is also successfully completed without dropping a byte or packet, the sampling rate length is doubled again from its value during the second round. This exponential increase is repeated until the sampling rate reaches the sampling rate adjustment threshold. When the sampling rate reaches the sampling rate adjustment threshold, the next round does not exceed the sampling rate adjustment threshold, but places the sampling rates value at the value of the sampling rate adjustment threshold. If the next sampling rate round is also successful, the sampling rate will increase during the next round, but this time, the increase will be incremental, instead of the exponential increase experienced below the sampling rate adjustment threshold.

If a sampling period adjustment round experiences a failure, such as dropping a byte and/or a packet, the sampling rate length for the next round is substantially decreased and progressively increased over a series of subsequent rounds as described above. In this manner, the sampling rate is adjusted based on the actual conditions of the network. In some examples, the sampling rate is continuously adjusted to account for real time changes in the network. In other examples, the balancing system settles on a sampling rate length for a period of time while balancing the load distributions of the loopback ports.

While this example is described with reference to a specific mechanism for adjusting a sampling rate, any appropriate mechanism for adjusting a sampling rate may be used in accordance to the principles described herein. For example, the sampling rate may be determined with a trial and error mechanism, with predetermined sampling rates, with a mechanism based on a sampling rate policy, with other mechanisms, or combinations thereof.

Figure 4:
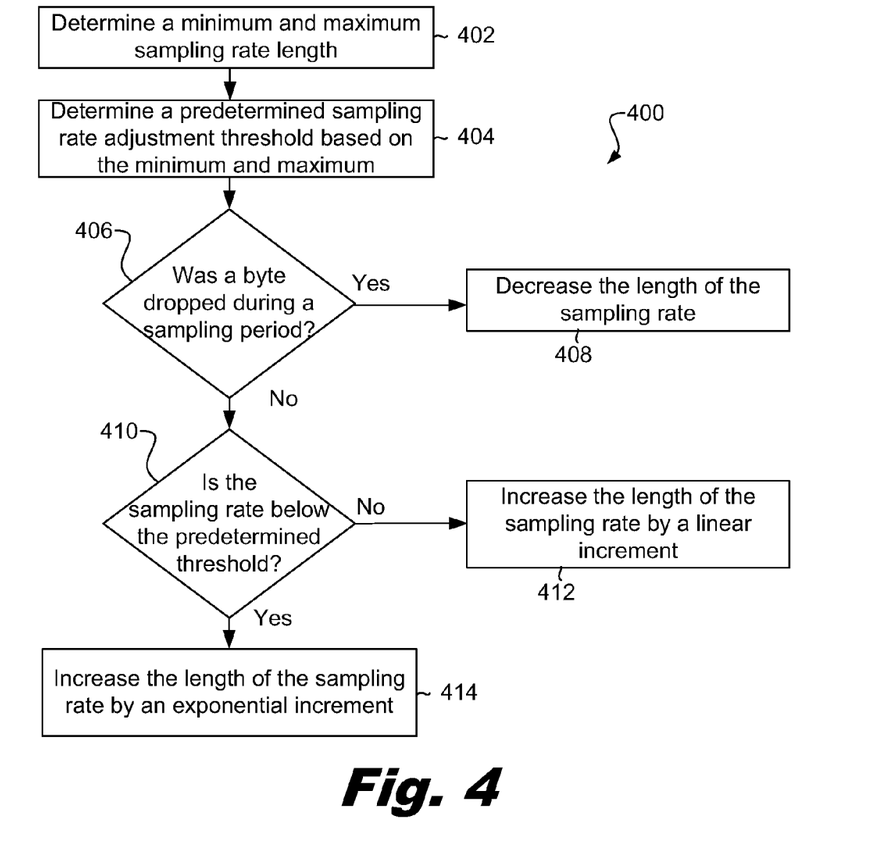
FIG. 4 is a diagram of an example of a flowchart of a process for determining a length of a sampling rate according to the principles described herein.

FIG. 4 is a diagram of an example of a flowchart (400) of a process for determining a length of a sampling rate according to the principles described herein. In this example, the process includes determining (402) a minimum and maximum sampling rate lengths. Such determinations may be made through user input, calculations, policies, other mechanisms, or combinations thereof. Also, the process includes determining (404) a predetermined sampling adjustment rate threshold based on the minimum and maximum sampling rate lengths. In some examples, the predetermined sampling adjustment rate threshold is the midpoint between the minimum and maximum sampling rate lengths. In other examples, the predetermined sampling adjustment rate threshold is determined through user input, made with a different calculation, a policy that considers the values of the minimum and maximum sampling rate lengths, other mechanism, or combinations thereof.

The process also includes determining (406) whether a byte was dropped during the previous sampling period. If so, the length of the sampling rate is decreased (408) for the next sampling period. If no bytes were dropped during the previous sampling period, then the process determines (410) whether the sampling rate of the last sampling period was below the predetermined sampling adjustment rate threshold. If above, the length of the sampling rate is increased (412) by a linear increment for the next sampling period. If below, the length of the sampling rate is increased (414) by an exponential increment for the next sampling period.

While this example has been described with reference to a specific sampling rate increase increments, any incremental increase according to the principles described herein may be used. The sampling rate for the next sampling period is increased more aggressively if the sampling rate is still below the predetermined sampling adjustment rate threshold because there is a higher probability that the sampling rate can be increased without negative consequences. However, if the sampling rate is already above the predetermined sampling adjustment rate threshold, then more caution is used when increasing the sampling rate to avoid negative consequences.

Figure 5:
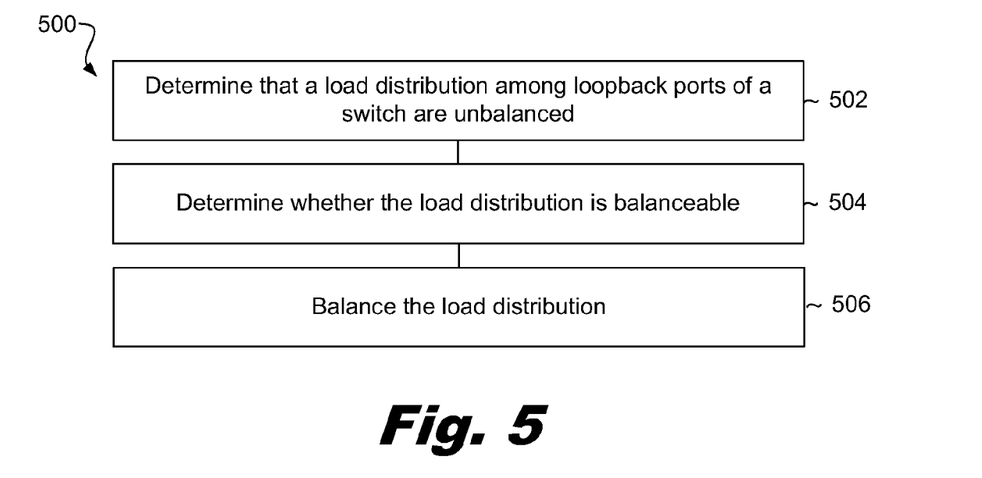
FIG. 5 is a diagram of an example of a method for load balancing loopback ports according to the principles described herein.

FIG. 5 is a diagram of an example of a method (500) for load balancing loopback ports according to the principles described herein. In this example, the method (500) includes determining (502) that a load distribution among loopback ports of a switch are unbalanced, determining (504) whether the load distribution is balanceable, and balancing (506) the load distribution.

The load distribution is considered to be balanceable, if the policies can be rearranged to allow a balanced load distribution. For example, a policy that prevents the loopback ports from servicing packets that are coming from certain loopback port service groups may be considered along with other considerations to see if some of the bandwidth to certain loopback ports can be appropriately reallocated to other loopback ports. If such policies will allow the load distribution to be rearranged, then the balancing system adjusts the sampling rate period, determines whether there is a balanced load between loopback ports of the same loopback service policy group, determines whether there is a balanced load distribution between loopback ports of different loopback service policy groups, other tasks, or combinations thereof.

The balancing system determines the drop rate of bytes and/or packets to the various loopback ports. Determining the drop rate helps the balancing system determine the appropriate sampling rate for determining whether the balancing processing has successfully balanced the load distribution.

Figure 6:
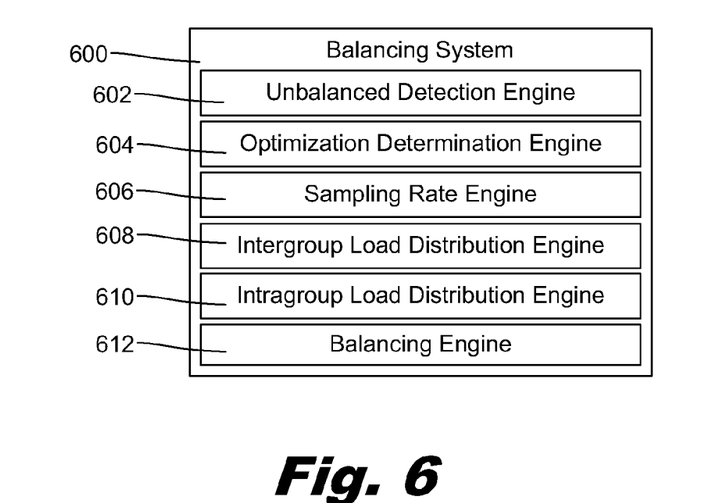
FIG. 6 is a diagram of an example of a balancing system according to the principles described herein.

FIG. 6 is a diagram of an example of a balancing system (600) according to the principles described herein. In this example, the balancing system (600) includes an unbalanced detection engine (602), an optimization determination engine (604), a sampling rate engine (606), an intergroup load distribution engine (608), an intragroup load distribution engine (610), and a balancing engine (612). The engines (602, 604, 606, 608, 610, 612) refer to a combination of hardware and program instructions to perform a designated function. Each of the engines (602, 604, 606, 608, 610, 612) may include a processor and memory. The program instructions are stored in the memory and cause the processor to execute the designated function of the engine.

The unbalanced detection engine (602) detects when the load distribution across the loopback ports of the switch are unbalanced. The optimization determination engine (604) determines whether the load distribution is capable of being balanced. If not, the balancing system continues to monitor the load distribution, but takes no action. In some examples, the optimization determination engine (604) waits for a predetermined waiting period after determining that the load distribution could not be balanced before making another attempt to determine if the load is balanced.

The sampling rate engine (606) determines the appropriate sampling rate to measure whether the load distribution is balanced. In some examples, the sampling rate engine (606) settles on a specific sampling rate, but in other examples, the sampling rate engine (606) continuously changes the sampling rate throughout the balancing process.

The intergroup load distribution engine (608) determines whether the load distribution across at least two groups of loopback ports is balanced. Each of the loopback ports may belong to a group assigned to specific loopback port service group such that each of the loopback ports cannot service specific packets that belong to loopback port service groups. The intragroup load distribution engine (610) determines whether the loopback ports within the individual groups have a balanced load distribution. The balancing engine (612) balances the load distribution. The balancing engine (612) may balance the load distribution by reallocating bandwidth and/or other resources across the loopback ports.

Figure 7:
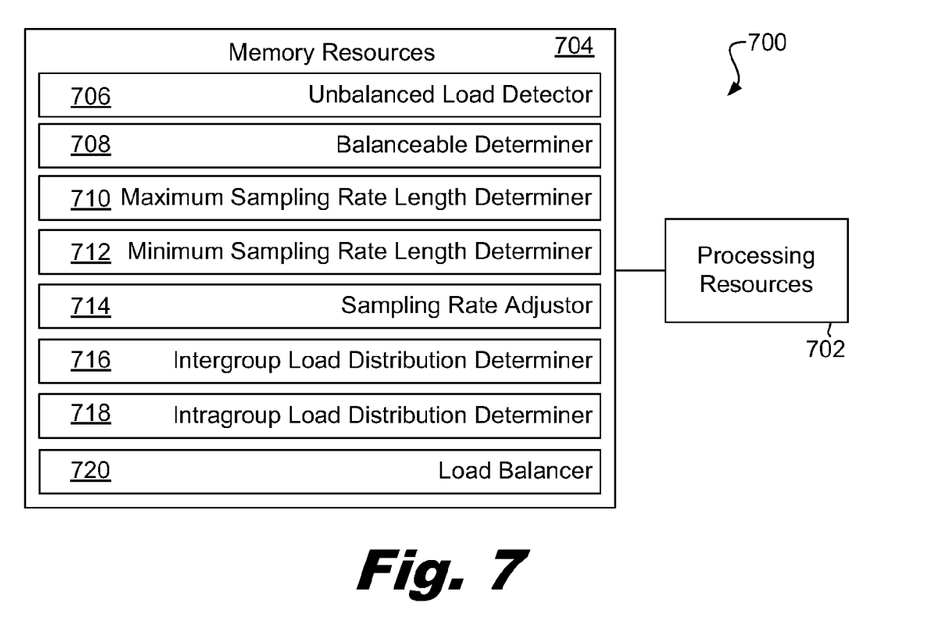
FIG. 7 is a diagram of an example of a balancing system according to the principles described herein.

FIG. 7 is a diagram of an example of a balancing system (700) according to the principles described herein. In this example, the balancing system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the balancing system (700). The programmed instructions shown stored in the memory resources (704) include an unbalanced load detector (706), balanceable determiner (708), a maximum sampling rate length determiner (710), a minimum sampling rate length determiner (712), a sampling rate adjustor (714), an intergroup load distribution determiner (716), an intragroup load distribution determiner (718), and a load balancer (720).

The memory resources (704) include a computer readable storage medium that contains computer readable program code to cause tasks to be executed by the processing resources (702). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The unbalanced load detector (706) represents programmed instructions that, when executed, cause the processing resources (702) to detect when the load distribution is unbalanced. The balanceable determiner (708) represents programmed instructions that, when executed, cause the processing resources (702) to determine whether the load distribution is capable of being balanced based on the polices by which the loopback ports are governed. The maximum sampling rate length determiner (710) represents programmed instructions that, when executed, cause the processing resources (702) to determine the maximum sampling rate length. The minimum sampling rate length determiner (712) represents programmed instructions that, when executed, cause the processing resources (702) to determine the minimum sampling rate length. The sampling rate adjustor (714) represents programmed instructions that, when executed, cause the processing resources (702) to adjust the sampling rate based on the bytes' and/or packets' drop rate.

The intergroup load distribution determiner (716) represents programmed instructions that, when executed, cause the processing resources (702) to determine whether the load distribution across different groups of loopback ports is balanced. The intragroup load distribution determiner (718) represents programmed instructions that, when executed, cause the processing resources (702) to determine whether the load distribution within individual groups of loopback ports is balanced. The load balancer (720) represents programmed instructions that, when executed, cause the processing resources (702) to balance the load distribution across the loopback ports by reallocating bandwidth and/or other resources.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries and may be accessed from a remote location over a network connection while the programmed instructions are located locally. Thus, the balancing system (700) may be implemented on a user device, on a server, on a collection of servers, or combinations thereof.

The balancing system (700) of FIG. 7 may be part of a general purpose computer. However, in alternative examples, the balancing system (700) is part of an application specific integrated circuit.

While the examples above have been described with reference to specific types of switches and networks, any appropriate type of switch and/or network may be used in accordance with the principles described herein. Further, while the examples have been described with reference to specific numbers of input ports, output ports, loopback ports, or other ports, any appropriate number or type of ports may be used in accordance with the principles described herein. Also, while the examples above have been described with reference to switches on either end of a tunnel, the switches may be located at any appropriate physical or logical location within a network.

While the principles described above have been described with reference to specific ways to determine how to detect whether the load distribution is unbalanced, any appropriate way to determine whether the load distribution is unbalanced may be used. Further, while the examples above have been described with reference to specific ways of determining whether the load distribution is capable of being balanced, any appropriate way to determine whether the load distribution is capable of being balanced may be used. Also, while the examples above have been described with reference to specific mechanisms to balancing the load distribution, any appropriate mechanism for balancing the load distribution may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for balancing load distributions of loopback ports in a packet routing switch, comprising:
    determining that a load distribution among loopback ports of the switch is unbalanced, wherein said switch comprises a number of input ports, output ports and separate loopback ports, each loopback port specifically to receive a recirculation of a packet already previously received by the switch;
    determining whether said load distribution is balanceable; and
    balancing said load distribution.

2. The method of claim 1, further comprising determining a drop rate for each of said loopback ports.

3. The method of claim 2, further comprising determining a length of a sampling period based on said drop rate.

4. The method of claim 3, wherein determining said length of said sampling rate includes identifying a maximum sampling rate.

5. The method of claim 4, wherein determining a length of said sampling period based on said drop rate includes identifying a predetermined sampling rate adjustment threshold below said maximum sampling rate.

6. The method of claim 5, wherein determining said length of said sampling rate includes increasing said sampling rate exponentially if said sampling rate is below said predetermined sampling rate adjustment threshold.

7. The method of claim 5, wherein determining said length of said sampling rate includes increasing said sampling rate linearly if said sampling rate is above said predetermined sampling rate adjustment threshold.

8. The method of claim 1, further determining whether said load distribution is balanced among groups of said loopback ports assigned to service different virtual local area networks.

9. The method of claim 1, further determining whether said load distribution is balanced internal to a group of said loopback ports assigned to service a single virtual local area network.

10. The method of claim 1, wherein determining that said load distribution among loopback ports of said switch is unbalanced includes determining that said load distribution is unbalanced with a unified metric.

11. A system for balancing load distributions of loopback ports in a packet routing switch, comprising:
an unbalanced detection engine to detect that a load distribution among loopback ports of the switch is unbalanced, wherein said switch comprises a number of input ports, output ports and separate loopback ports, each loopback port specifically to receive a recirculation of a packet already previously received by the switch;
an optimizing determination engine to determine whether said load distribution is balanceable;
a sampling rate engine to select a length of a sampling rate based on a drop rate of said loopback ports; and
a balancing engine to balance said load distribution.

12. The system of claim 11, further comprising an inter-group load distribution engine to determine whether said load distribution is balance among groups of said loopback ports.

13. The system of claim 11, further comprising an intra-group load distribution engine to determine whether said load distribution is balanced internal to a group of said loopback ports assigned to service a single loopback service policy group.

14. A computer program product for balancing load distributions of loopback ports, comprising:
a non-transitory computer readable storage medium, said non-transitory computer readable storage medium comprising computer readable program code embodied therewith, said computer readable program code comprising program instructions that, when executed, causes a processor to:
detect that a load distribution among loopback ports is unbalanced;
determine whether said load distribution is balanceable;
select a length of a sampling rate based on a drop rate of said loopback ports;
determine whether said load distribution is balance among groups of said loopback ports assigned to service different loopback service policy group;
determine whether said load distribution is balance internal to a group of said loopback ports assigned to service a single loopback service policy group; and
balance said load distribution; and
adjust said length of said sampling based on whether said sampling rate is above or below a predetermined sampling rate adjustment threshold.

15. The computer program product of claim 14, wherein said loopback ports are incorporated in a packet routing switch that comprises a number of input ports, output ports and separate loopback ports, each loopback port specifically to receive a recirculation of a packet already previously received by the switch.

16. The method of claim 1, further comprising, when balancing said load distribution, following loopback port service policies that restrict to which loopback ports any particular packet can be sent.

17. The method of claim 1, further comprising:
receiving a packet on a non-loopback port of said switch;
determining that said packet is a tunnel packet and encapsulates a second packet;
removing a tunnel header to de-capsulate the second packet; and
with a loopback port selector, send the second packet, after de-capsulation, to one of said loopback ports for a further processing by said switch.

18. The method of claim 1, wherein receipt of a packet by a loopback port selector of said switch triggers said determining whether said load distribution is unbalanced.

19. The method of claim 1, further comprising consulting historical records of a loopback port selector to determine whether said load distribution among said loopback ports of said switch is unbalanced.

20. The method of claim 1, wherein balancing said load distribution comprises reallocating bandwidth among said loopback ports or groups of said loopback ports.

* * * * *